April 29, 1958     H. J. CHALL     2,832,531
ACTUATING MECHANISM FOR ADDING MACHINE
Original Filed Jan. 29, 1954     10 Sheets-Sheet 3
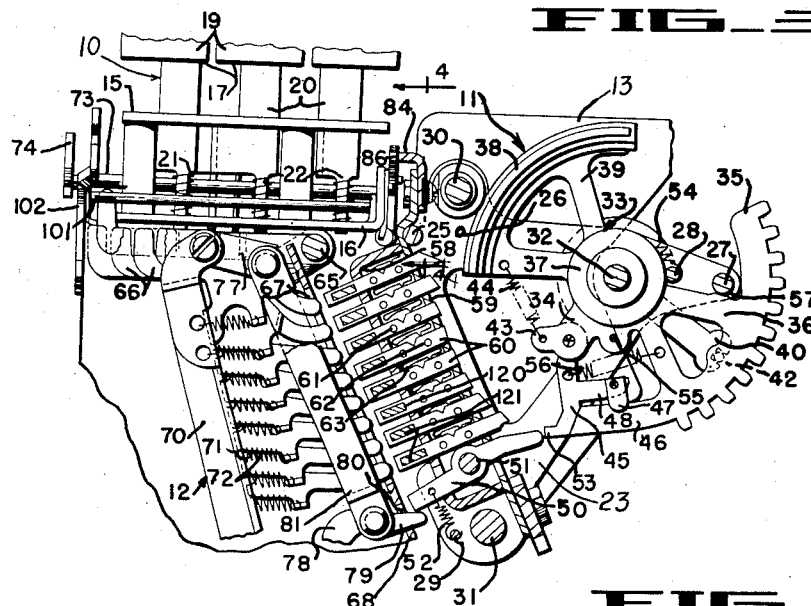
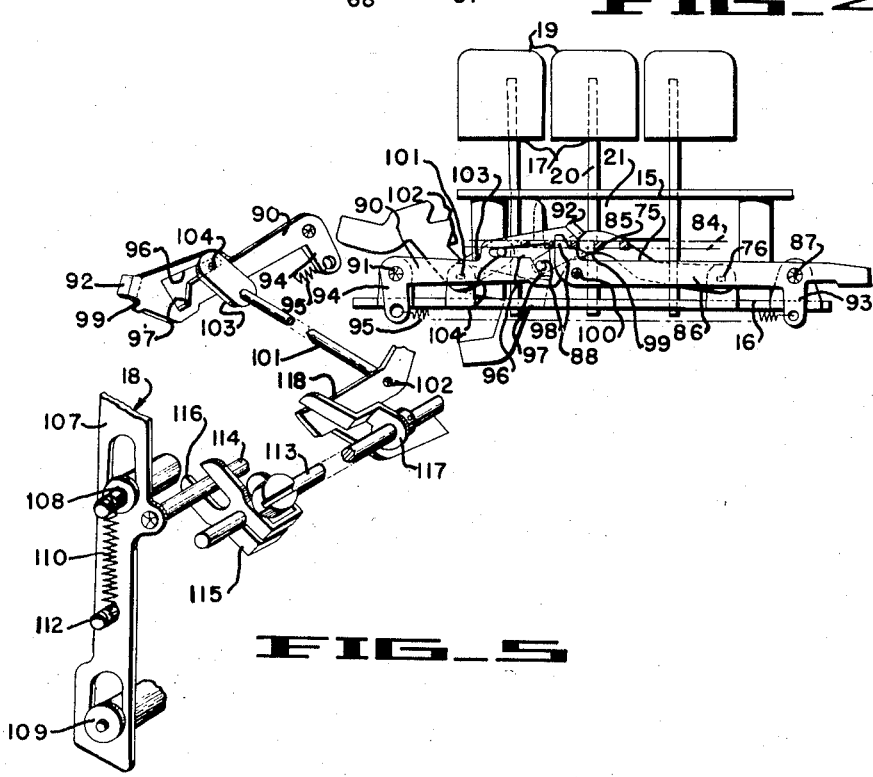

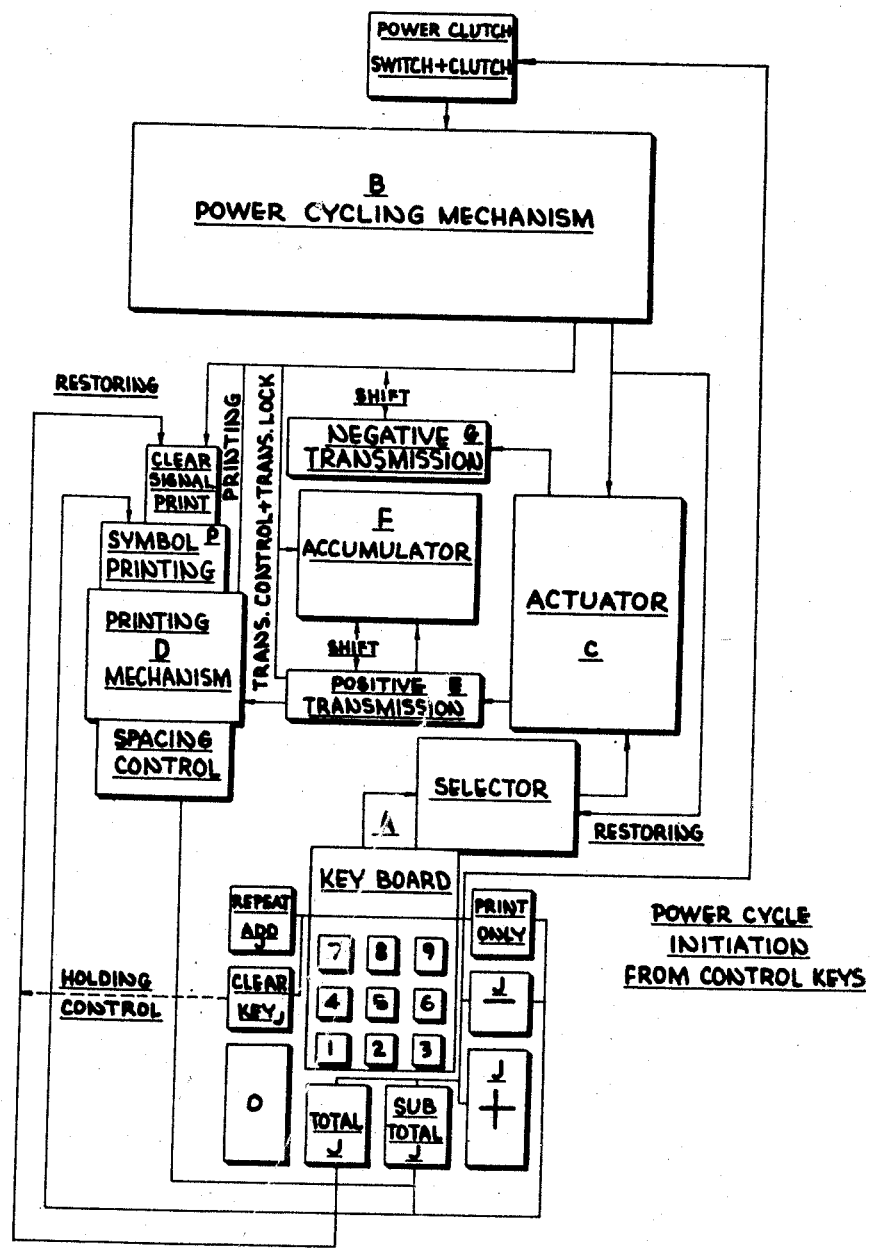

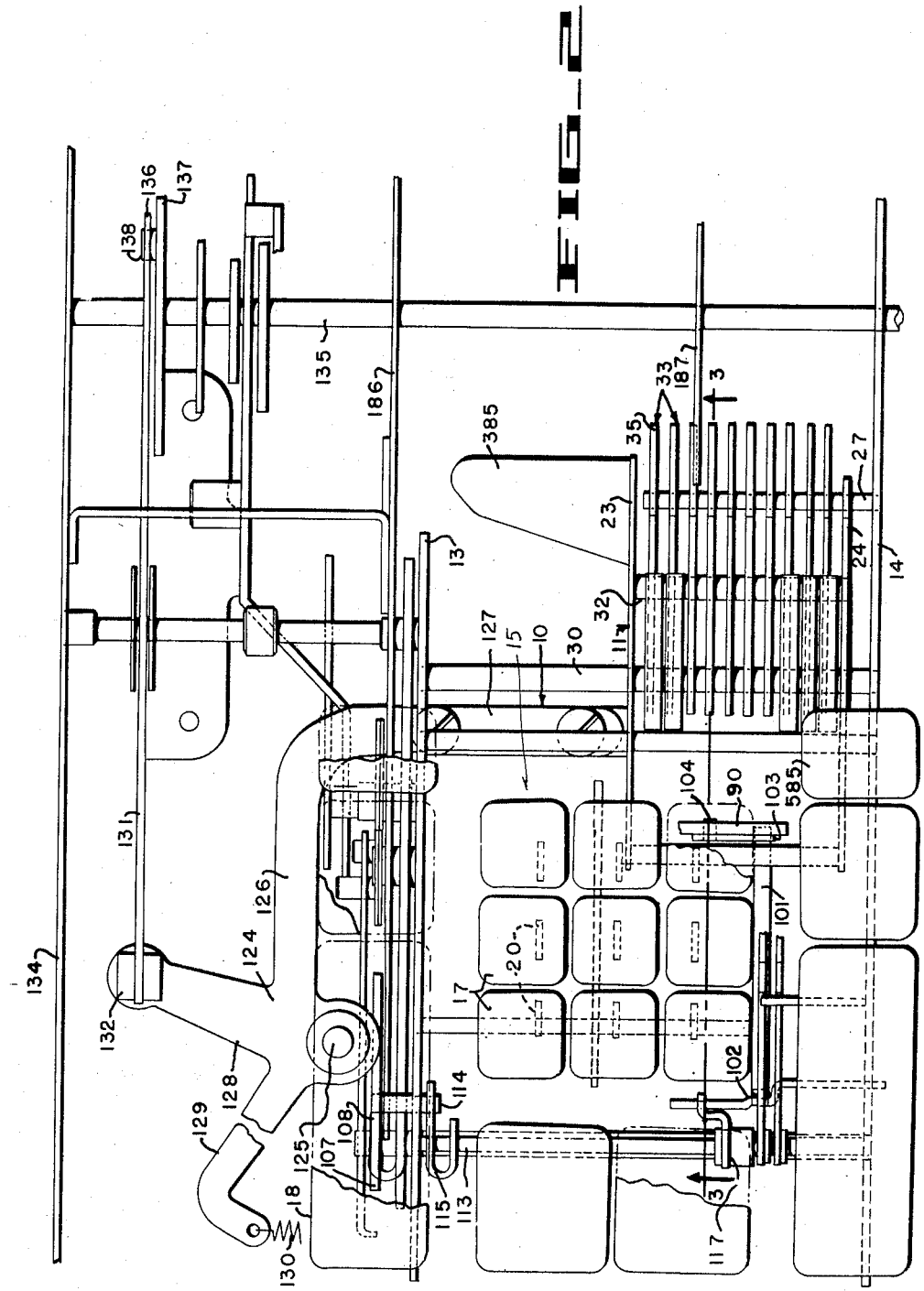

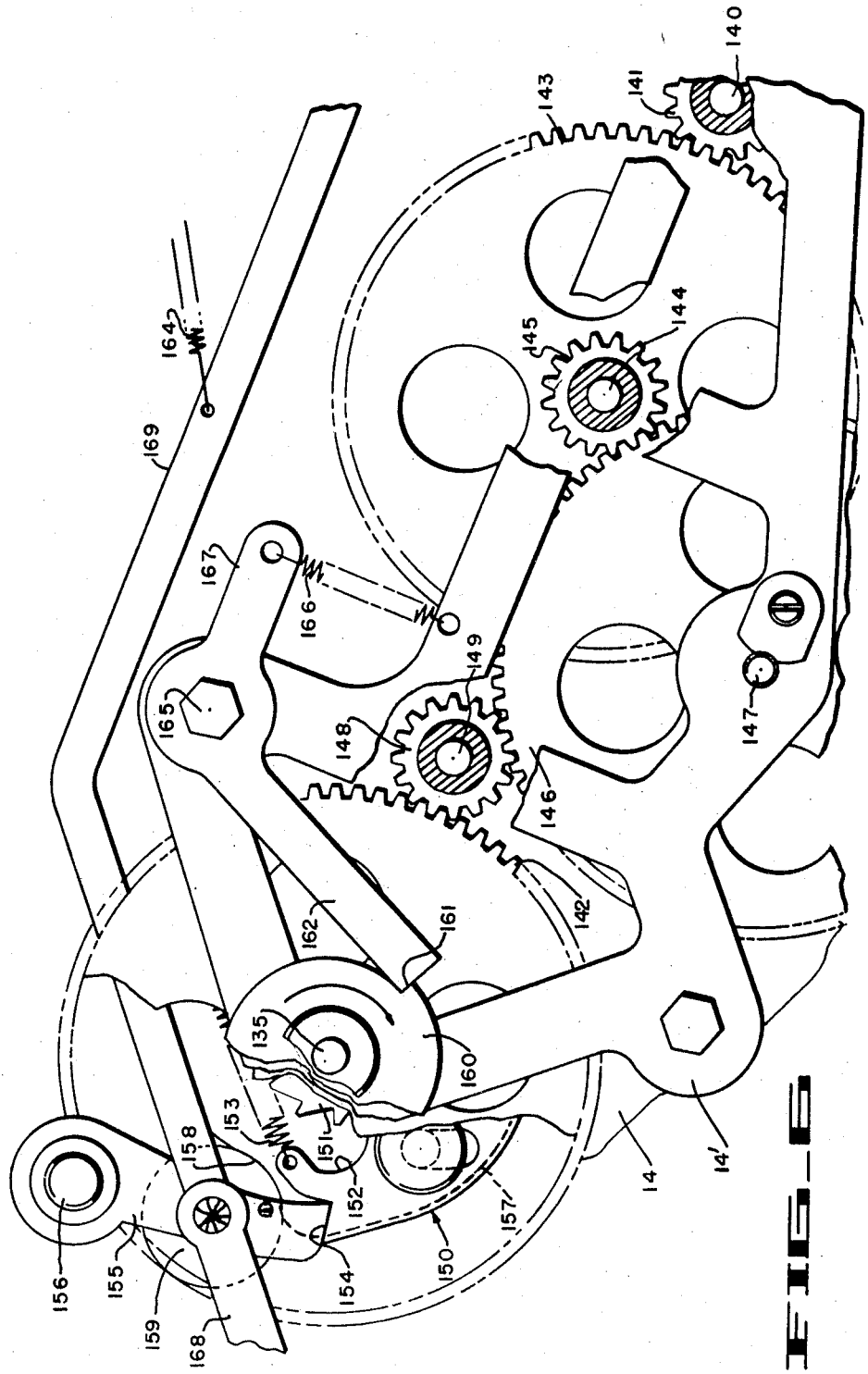

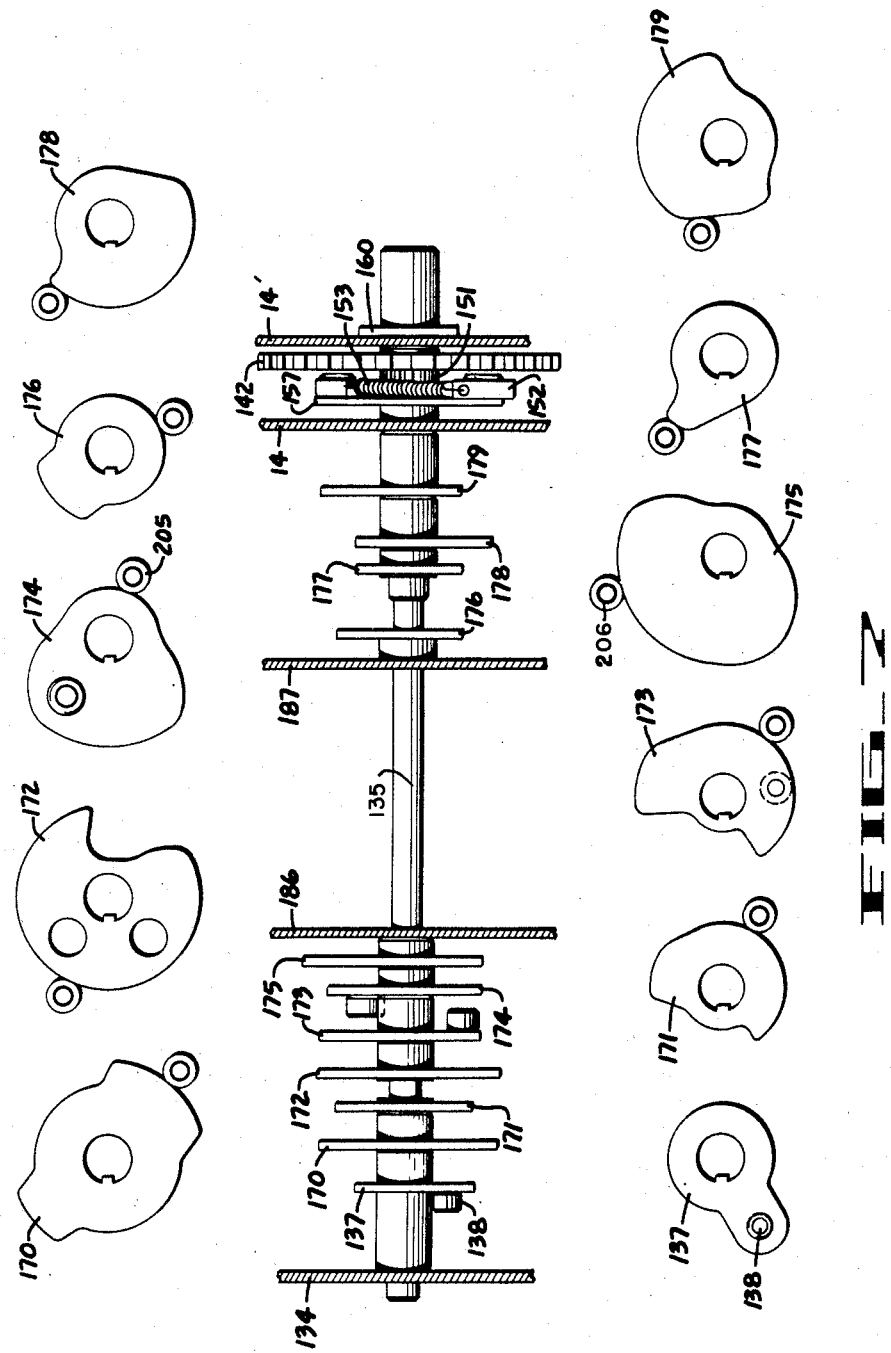

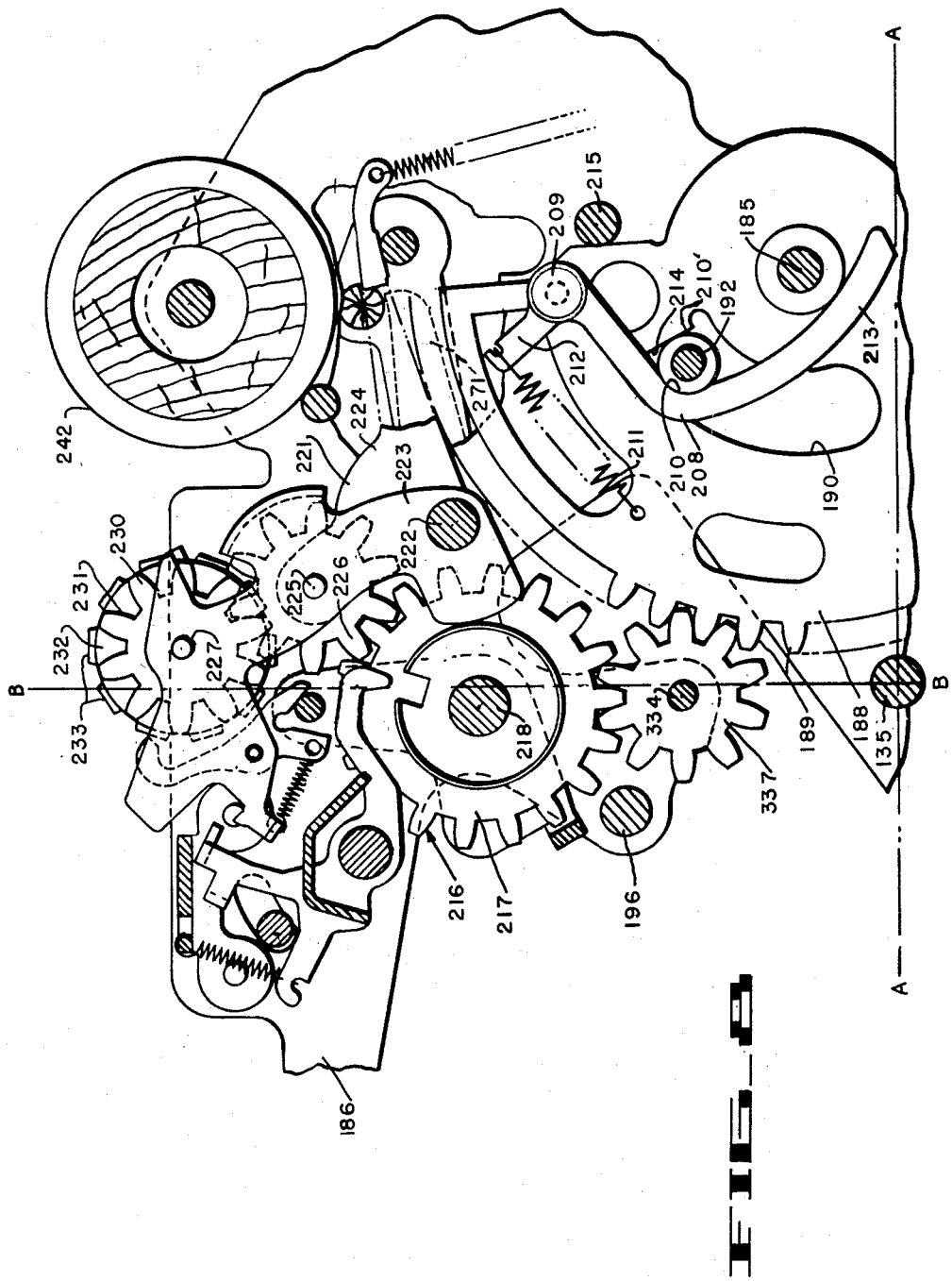

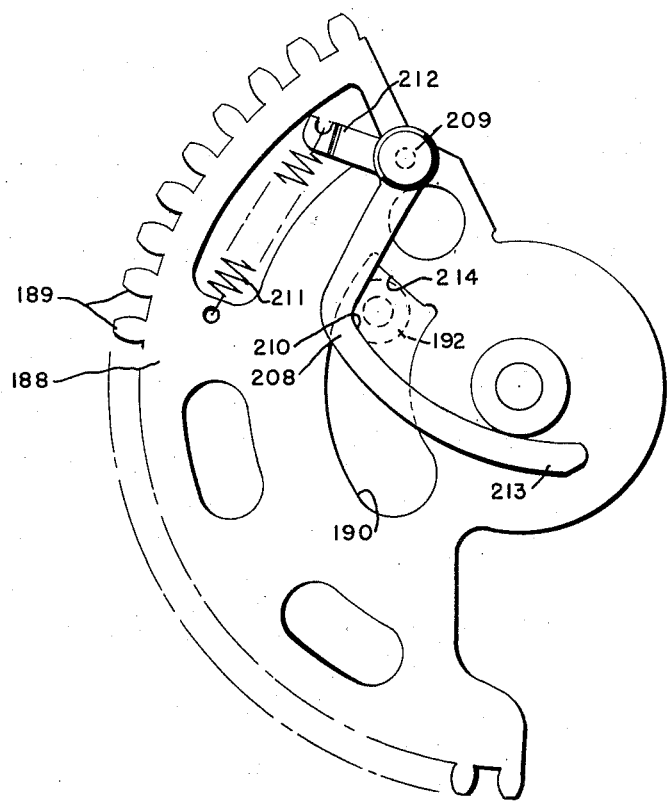
FIG_9

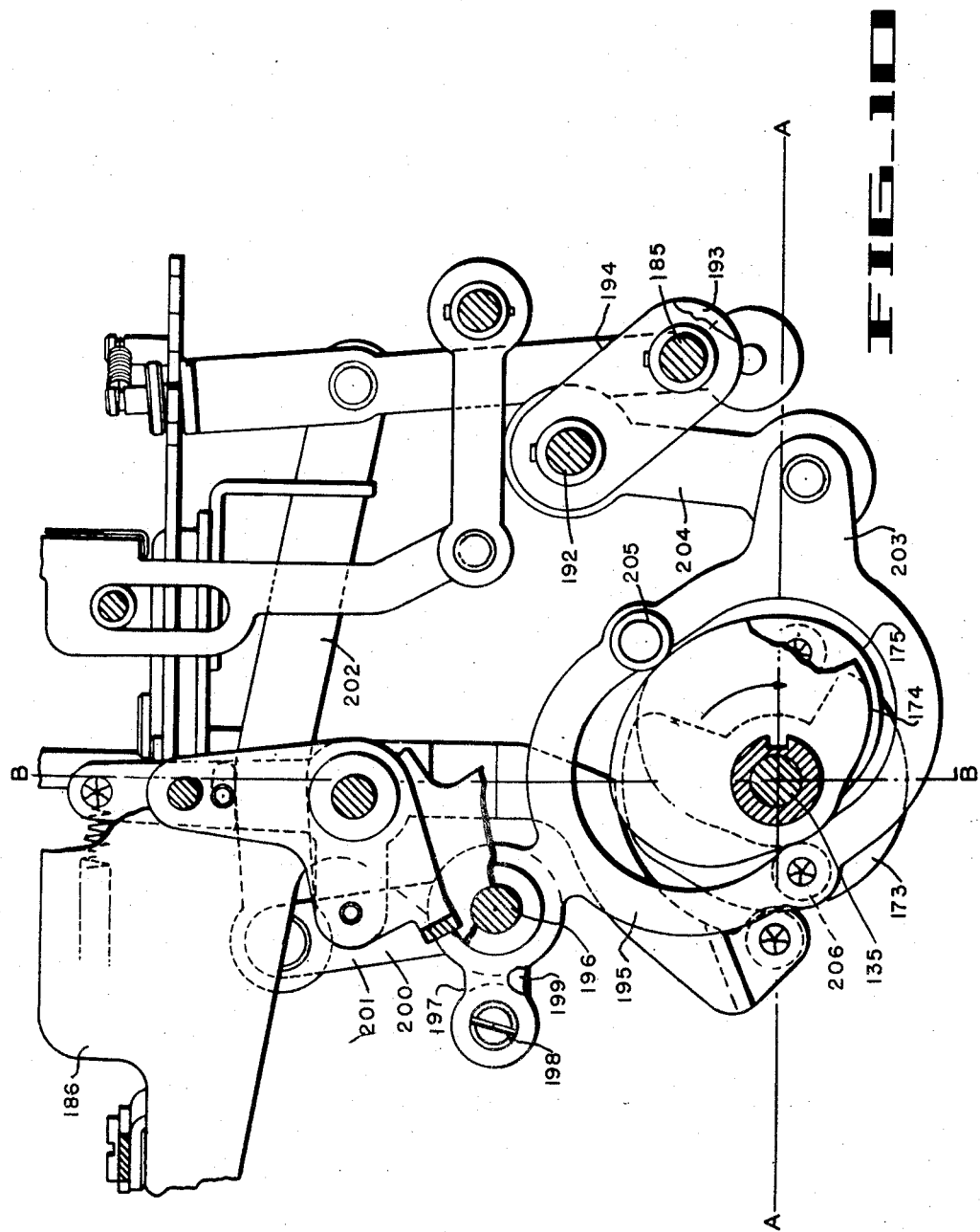

April 29, 1958     H. J. CHALL     2,832,531
ACTUATING MECHANISM FOR ADDING MACHINE
Original Filed Jan. 29, 1954     10 Sheets-Sheet 9
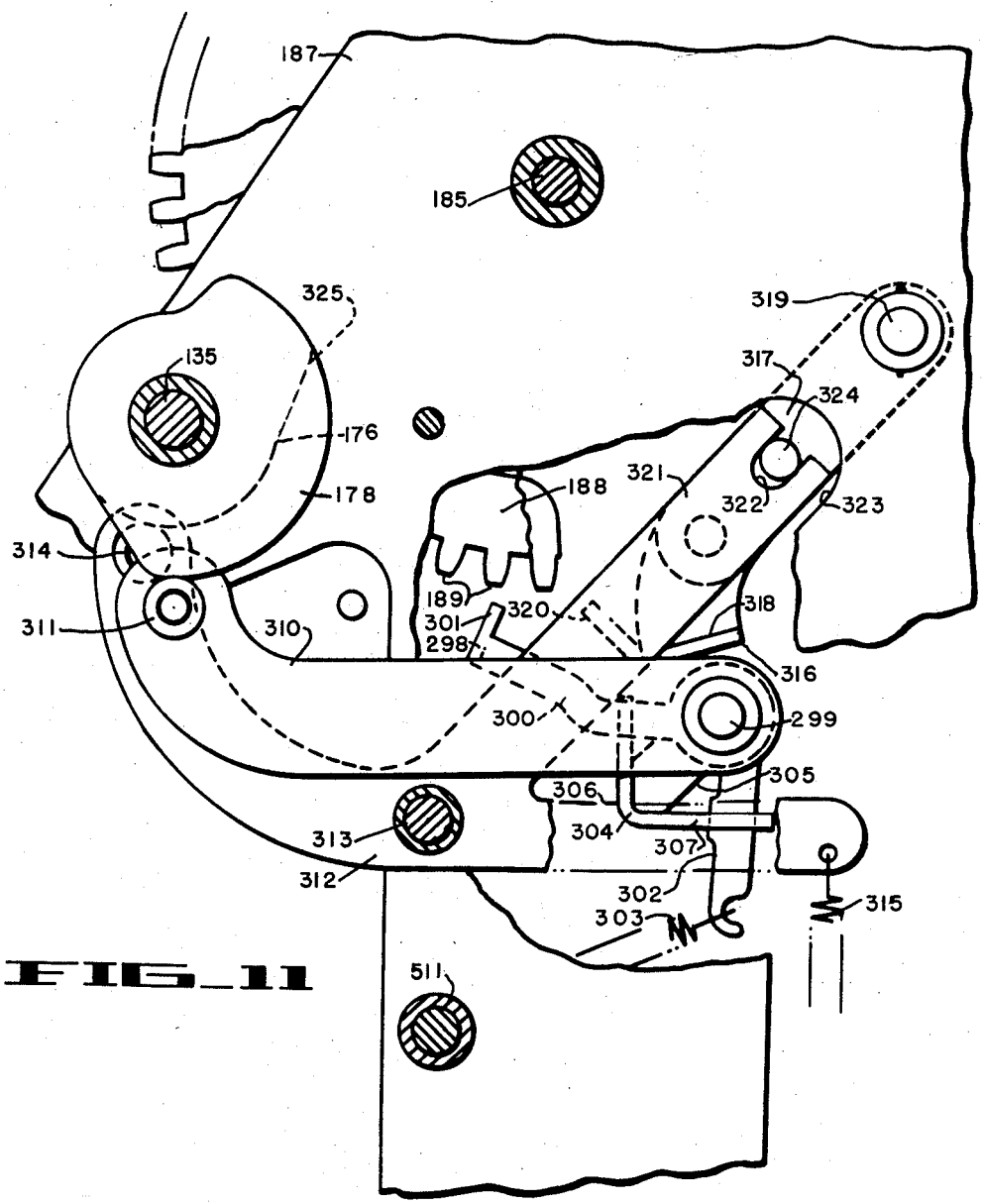
FIG_11

April 29, 1958        H. J. CHALL        2,832,531
ACTUATING MECHANISM FOR ADDING MACHINE
Original Filed Jan. 29, 1954        10 Sheets-Sheet 10
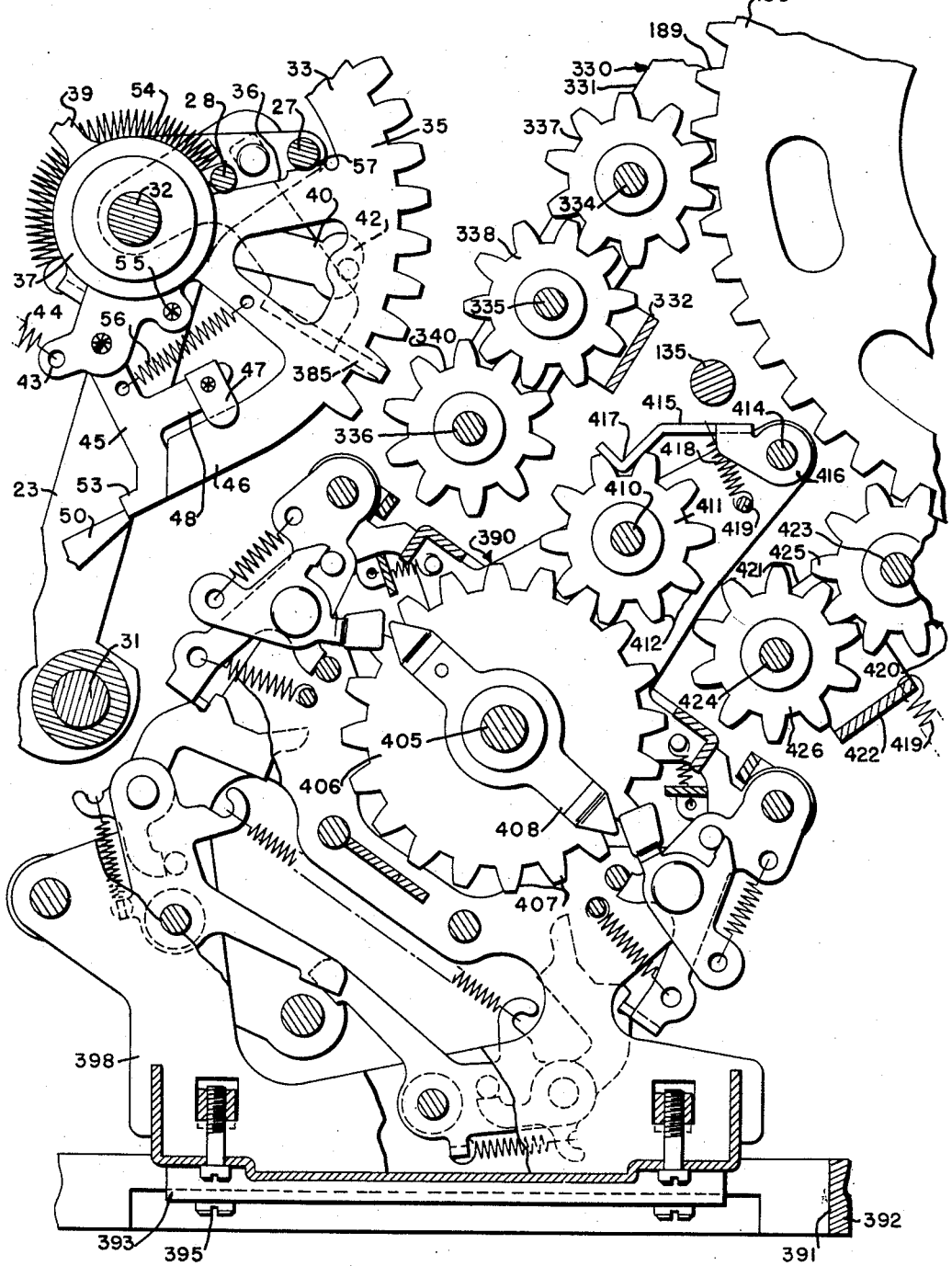
FIG_12

United States Patent Office 2,832,531
Patented Apr. 29, 1958

2,832,531
ACTUATING MECHANISM FOR ADDING MACHINE

Harold J. Chall, San Leandro, Calif., assignor to Friden, Inc., a corporation of California Original application January 29, 1954, Serial No. 407,016. Divided and this application March 16, 1954, Serial No. 416,730

11 Claims. (Cl. 235—60)

INDEX

| Title | Column |
|---|---|
| Selection mechanism | 5 |
|   1. Keyboard mechanism | 5 |
|   2. Selector mechanism | 6 |
|   3. Escapement mechanism | 9 |
|   4. Zero key mechanism | 10 |
|   5. Stop pin retracting mechanism | 11 |
|   6. Shiftable selector unit return mechanism | 11 |
| Power cycle mechanism | 12 |
|   1. Speed reducing gear train | 12 |
|   2. Single rotation clutch | 12 |
|   3. Cam and cam shaft assembly | 13 |
| Actuating mechanism | 14 |
| Printing mechanism | 15 |
| Positive transmission gear mechanism | 17 |
| Accumulator mechanism | 18 |
| Negative transmission gear mechanism | 19 |

This invention relates to mechanical calculating machines, such as portable, key operated adding machines, and more particularly to actuator mechanism for such a machine, and is a division of application S. N. 407,016, filed January 29, 1954.

It is among the objects of the invention to provide an improved power driven actuating mechanism for a calculating machine having digitation mechanism, accumulator mechanism and printing or register mechanism, which actuating mechanism is effective to read out entry values from the digitation mechanism to the accumulator mechanism and the printing or register mechanism; which includes ordinally arranged actuator racks and power operated means effective to differentially set such racks to positions determined by the digitation mechanism and to return the racks to their full-cycle or "0" position; which has the power operated means movable through a complete operative cycle away from and back to its full-cycle position during each operative cycle of the machine, and includes pressure releasable connections between the individual actuator sectors and the power operated means permitting the actuator sectors to stop in differentially set positions while the power operated means completes its movement to its location most remote from its full-cycle position; which includes positive transmission mechanism for alternatively connecting the actuator sectors to the digitation mechanism or the accumulator mechanism, and negative transmission mechanism operative in lieu of the positive transmission mechanism to connect the actuator sectors to the accumulator; and which simultaneously reads out the digit values of the various orders of an entry value from the orders of the digitation mechanism, simultaneously enters the digit values of the orders of the entry number into the accumulator mechanism and simultaneously reads out the digit values of the orders of an accumulated value from the accumulator mechanism to the printing or register mechanism.

Other objects and advantages will become apparent from a consideration of the following description and the appended claims in conjunction with the accompanying drawings wherein:

Fig. 1 is a diagrammatic illustration of the adding machine;

Fig. 2 is a fragmentary top plan view of the front portion of the adding machine with the cover removed;

Fig. 3 is a fragmentary cross-sectional view on an enlarged scale on the line 3—3 of Fig. 2;

Fig. 4 is a fragmentary cross-sectional view on the line 4—4 of Fig. 3;

Fig. 5 is a fragmentary perspective view of the zero key stem and mechanism actuated thereby;

Fig. 6 is a view of the speed reducing gear train of the machine from the motor shaft to the cam shaft clutch, such speed reducing gear train being located at the right-hand side of the machine;

Fig. 7 is a front elevational view showing the machine cam shaft, the cams carried by the cam shaft, the location of the various cams along the cam shaft, and the form in plan view of the various cams;

Fig. 8 is a view showing a portion of the printing machanism and particularly the print wheels, the print wheel drive and the operating mechanism for the print wheels;

Fig. 9 is a side elevational view of one of the actuator sectors fragmentarily illustrated in Fig. 8;

Fig. 10 is an elevational view of the actuator sector trail and lead cams, a print controlling cam and tens-carrying accumulator operating cam, and the mechanisms operated by these several cams;

Fig. 11 is an elevational view from the right-hand side of the machine showing the mechanism for aligning the actuator sectors of the machine in proper rotational position for the printing operation and means for releasably locking the actuator sectors in properly aligned condition during the printing operation;

Fig. 12 is a cross-sectional view of the accumulator, the positive gear transmission mechanism, the negative gear transmission mechanism, and the immediately associated parts of the machine.

Lines A—A and B—B on Figs. 8 and 10 indicate reference planes of which the plane indicated by line A—A is parallel to the machine keyboard and extends through the cam shaft axis and the plane indicated by the line B—B perpendicularly intersects the first plane along the cam shaft axis.

With continued reference to the drawings and particularly to Fig. 1, the adding machine of the present invention comprises, in addition to a suitable base, a suitable mechanism supporting framework and a mechanism cover, selection mechanism A including a ten-key keyboard and an input value selection device having selector racks which are sequentially set to selected values from a higher to the lower order corresponding to values entered therein by manual depression of selected keys of the keyboard. It also comprises a printing mechanism D, and accumulator F, a power driven actuator C controlled by the selection device, power cycling mechanism B, a positive transmission E which drivingly connects the actuator with the printing mechanism at all times and alternatively connects the actuator with the selector mechanism or the accumulator, a negative transmission G which at times connects the actuator to the accumulator, and a set of control keys J including an addition key, a subtraction key, a subtotal key, a total key, a print only key, a keyboard clearing key and a repeat addition key, all as diagrammatically indicated in Fig. 1.

The power cycling device includes motor driven cam shaft carrying a plurality of mechanism actuating cams and transmission means between the motor and the cam shaft effective to turn the cam shaft through one complete rotation and bring it to a stop each time a control key of the machine is operated.

The positive and negative transmissions each have a neutral position and one transmission always occupies its neutral position while the other is in its operative position and both are bidirectionally operative to either transmit values from the selector mechanism to the accumulator or to transmit values from the accumulator to the printing mechanism.

The input value selector includes a unit laterally shiftable relative to the actuator and accumulator under control of an escapement mechanism as values are entered therein so that the digits of a value of any number of digits within the capacity of the selector are simultaneously transmitted through the actuator to the printing mechanism and the accumulator upon the operation of any one of the addition, repeat addition or subtraction control key.

Before operation of a value transmitting control key, a value can be cleared from the selector by operation of the keyboard clearing key without printing and without changing the total in the accumulator or feeding the printing tape.

The printing mechanism includes a paper tape on which the values are printed and an ink carrying ribbon which is preferably divided longitudinally into two portions of different colors. There is a tape feeding mechanism provided with a spacing adjustment which is effective to feed the tape in single space steps while entry values are being entered into the machine and printed and when a value is printed without entry into the machine accumulator, to double space the tape feed whenever a "total" value is printed to thereby clearly offset the total figures from the following column of entry value figures on the tape, and to interrupt tape feeding when the keyboard clearing key is depressed. There is also a ribbon shift means which is effective to position the ribbon in one color position when a positive or additive quantity is printed and in a different color position when a negative or subtractive quantity is printed and means are provided for winding the ribbon back and forth between spaced-apart ribbon spools.

The actuator includes a plurality of sectors which are power oscillated to accomplish an advance stroke and a return stroke each time a control key is operated. On the advance stroke the actuators are moved to an extent determined by the positioning of the associated input value selector elements by the keyboard keys and, on the return stroke, are moved to their home or full-cycle position. On their advance stroke the actuator segments transmit the selector values through the positive transmission to the printing mechanism, the printing ribbon being shifted in accordance with whether the addition or subtraction control key is operated. On their return stroke the actuator segments transmit the value through either the positive or negative transmission to the accumulator in accordance with the operation of the addition or subtraction control key. The accumulator is operated in one direction by the positive transmission and in the opposite direction by the negative transmission and includes tens-transfer mechanism effective to transfer tens from any order to the next higher order in either direction of operation. The accumulator will thus accumulate both positive and negative values to a positive or negative total, as the case may be.

Because of mechanical requirements the positive zero setting of the accumulator is spaced one unit space from the negative zero setting with the consequence that when the positive zero setting is a series of zeroes, the simultaneous negative setting is a series of nines and, conversely when the accumulator has a negative zero setting, the corresponding positive setting is a series of nines. Under these conditions, if the accumulator were at its positive zero setting and a unit digit were subtractively entered, this entry would move the negative setting from a series of nines to a series of zeroes giving an erroneous total of zero. Likewise, if the accumulator is at its negative zero setting and a unit digit is additively entered, the positive setting would be changed from a series of nines to a series of zeroes also giving an erroneous total. This error would always occur regardless of the value entries whenever the accumulator passed through a positive or negative zero setting following a change in its direction of operation.

This mechanical inaccuracy in the accumulator is compensated by a "fugitive 1" addition mechanism which adds a unit to the lowest order of the accumulator whenever the highest order passes through its "0" position after a change in operational direction. This addition of the "fugitive 1" when a unit digit is added to the accumulator while in its negative zero position, changes the erroneous zero total to the correct positive "1" total and, when a unit digit is subtracted from the accumulator when in its positive zero position, changes the erroneous zero total to the correct negative "1" total.

The accumulator will thus carry the true total whether the sign be positive or negative.

The accumulator also includes mechanism which senses the sign of the total value in the accumulator and conditions the associated total taking mechanism to take either a positive or a negative total.

When the total or subtotal control key is depressed, the actuator is drivingly connected with the accumulator through either the positive or negative transmission, depending on the condition of the sign sensing mechanism of the accumulator, and, upon cycling of the machine by the power cycling mechanism, reads out the total in the accumulator and transfers the total to the printing mechanism which prints it on the associated tape near the middle of the machine cycle.

When the total key is depressed, the actuator is connected to the accumulator during the advance stroke of the actuator to read out the total in the accumulator and transfer this value to the printing mechanism and is disconnected from the accumulator at the end of the advance stroke of the actuator so that the accumulator is not operated during the return stroke of the actuator but is left in its zero setting or cleared condition. However, when the subtotal key is operated, the actuator is maintained in driving relationship with the accumulator during both the advance stroke and the return stroke of the actuator so that the total value read out of the accumulator on the advance stroke of the actuator is returned to the accumulator on the return stroke of the actuator and further entries are added to, or subtracted from, this restored total.

The printing mechanism includes symbol printing apparatus which is driven by a special unit of the actuator and power cycling mechanism but controlled by the control keys and accumulator so that it will print the proper symbol for the operation performed and give the proper sign to the symbol. Thus, the following symbols may be used to indicate the different operations and the sign of the quantity printed:

| | |
|---|---|
| Addition | No symbol. |
| Subtraction | (Minus sign in negative ribbon color.) |
| Subtotal—positive | S. |
| Subtotal—negative | S̄. |
| Total—positive | T. |
| Total—negative | T̄. |
| Print only | N. |

There is also a clear signal printing mechanism which, upon the next additive, subtractive or print only cycle following a total cycle, prints a clear signal symbol, for example a "C," on the tape to indicate that the accumulator had been cleared before the new entry was made.

The print only key is used when it is desired to print a number, such as an identifying or code number, on the tape without entry of such number as a value into the accumulator. This is accomplished by connecting the selector to the printing mechanism through the positive transmission and actuator during the advance stroke of the actuator and blocking any connection between the actuator and accumulator during the return stroke of the actuator.

The control keys are all connected to the power cycling mechanism in a manner to initiate a cycle or rotation of the power cycling mechanism whenever a control key is operated. The power cycling mechanism is so constructed and arranged that it will automatically complete a full cycle or rotation and come to a stop at a predetermined angular position once a cycle has been initiated by depression of a control key. Blocking means are also provided so associated with the control keys that only one control key can be operated at a time and no other control key can be operated until after the completion of the cycle initiated by this operated key.

This precludes the possibility of forcing the machine to attempt two or more different operations at the same time and thus avoids probable errors and damage to the machine mechanism.

The machine will thus print positive and negative entries and distinguish between the positive and negative values printed, will accumulate the entry values into positive and negative totals and compensate inherent mechanical errors to provide true total values, will read out and print totals and subtotals and automatically sense the positive or negative nature of such totals, will repeat add the same value any desired number of times, will print numbers without entering such numbers into the accumulator, will clear itself whenever a total is taken but will retain its total when a subtotal is taken, will print appropriate symbols indicating the nature of the entry or the total and can be cleared of an erroneous entry before the entry is printed or accumulated.

SELECTION MECHANISM

While the selection mechanism is similar in construction and operation to that disclosed in the Taylor Patent No. 2,628,030, and in the Friden Patents Nos. 2,371,752, patented March 20, 1945, and 2,376,997, patented May 29, 1945, it differs in several respects from these prior art devices and particularly in that, whereas the selector segments of the prior art devices are read out seriatim, in the device of the present invention the input value carrying sectors are all read out simultaneously.

Referring now to Figs. 2, 3, 4 and 5, the selection mechanism comprises in general a keyboard assembly 10, a selector assembly 11 and a zero latch and settable stop pin assembly 12.

1. Keyboard mechanism.—Figs. 2, 3, 4 and 5

The keyboard assembly includes a key supporting structure disposed between and fixedly mounted on longitudinally extending machine frame plates 13 and 14 which are mounted substantially perpendicularly from the machine base and are substantially parallel to each other. The supporting structure includes plates 15 and 16 disposed in spaced-apart and substantially parallel relationship to each other above the forward portion of the machine base and provided with apertures which slidably receive the stems of the selection or value setting keys 17, the zero key 18 being slidably mounted at the left-hand side of the keyboard.

Each value setting key 17 has a stem 20 of rectangular cross-section shape slidably received in corresponding mutually registering apertures in the upper and lower support plates 15 and 16 and has a head or button 19 fixed on the upper end of its stem. The keys 17 are arranged in a square of three rows with three keys in each row and are consecutively numbered from "1" to "9."

Each key stem 20 has a portion extending directly from the upper plate through an aperture in the lower plate and a laterally offset arm 21 extending across the longitudinal center line of the keyboard, each arm having a downwardly directed plunger portion extending through an aperture in the bottom plate 16, which apertures are arranged substantially in a line extending longitudinally of the keyboard intermediate the width thereof.

A compression spring 22 is so connected between each key stem 20 and the bottom plate 16 that these springs resiliently urge the keys upwardly to a limiting position as determined by the engagement of the top edges of the offset arms 21 with the bottom surface of the upper key supporting plate 15.

2. Selector mechanism.—Figs. 2 and 3

The selector assembly 11 includes a cage having end plates 23 and 24 extending longitudinally of the machine substantially perpendicular to the plane of the machine base and held in substantially parallel relationship to each other by spaced-apart tie rods 25, 26, 27, 28 and 29 extending through the cage end plates and transversely of the space therebetween. The end plates are slidably mounted on parallel guide rails 30 and 31 which extend transversely of the machine and through apertures in the end plates 23 and 24, the length of the guide rails being such that the selector unit has a freedom of translational movement substantially equal to its own length transversely of the machine. The end plates 23 and 24 support a sector mounting shaft 32 which extends transversely of the space between the end plates substantially parallel to the tie rods 25 to 29, inclusive. A plurality of ordinarily arranged input value selector sectors, generally indicated at 33, are journalled on the shaft 32.

Each input value selector sector includes a rack element having a hub 34 mounted on the shaft 32, a toothed arcuate rim 35 spaced from the hub 34, and extending through an angle of approximately 90 degrees, and a spoke structure 36 mounting the rim 35 on the associated hub 34, and a dial element including a hub 37 mounted on shaft 32, an arcuate rim 38 spaced from the hub and extending through an angle of approximately 90 degrees in spaced relationship to the rack element rim 35, and a spoke structure 39 mounting the rim 38 on the dial hub 37. The dial rim 38 has a peripheral surface of partly cylindrical shape and has a series of numerals from "0" to "9" spaced apart therealong.

An arm 40 projects radially from the dial hub 37 in a direction away from the dial rim 38 and has a notched outer end disposed adjacent one side of the rack rim 35. A stud 42 projects from the rack rim into the notch in the outer end of the arm 40 but has a diameter less than the width of the notch so that a limited freedom of angular movement is provided between the rack element and the dial element of each selector sector 33. The rack hub 34 has a radial projection 43 and a tension spring 44 connected between the projection 43 and the related dial spoke structure 39 resiliently urges the dial element of the selector sector 33 to a limiting angular position relative to its associated rack element. The angular movement of the dial element relative to the rack element suppresses the tendency of the selector sector 33 to rebound when its rack element encounters a pin stop or a fixed zero stop, as will be presently described.

A live pawl 45 is pivotally mounted at one end on the rack element hub extension 43 and bears adjacent its other end against the distal end of a tangential extension 46 of the rack element rim 35. A clip 47 mounted on a lateral extension 48 of the pawl 45 slidably engages the rack element rim 35 to guide the pawl in its rocking movements about its pivotal connection with the hub extension 43 and dampen the free movement of the pawl.

Each selector sector is releasably held in its full-cycle or home position by a latch lever 50 pivotally mounted intermediate its length on a latch shaft 51 which extends across the space between the cage end plates 23 and 24 and is secured at its ends to these end plates. The latch lever 50 extends longitudinally of the machine and is resiliently urged by tension spring 52 to latching position in which its rearward end engages the forwardly projecting nose 53 on the free end of the pawl 45. Each selector sector is urged to turn about shaft 32 in a clockwise direction, as viewed in Fig. 3, by a tension spring 54 which is wound partly around the sector hub and has one end connected to a sector carried stud 55 and its other end connected to the tie rod 28. Each live pawl 45 is resiliently held against the adjacent end of the corresponding rack element rim extension 46 by a tension spring 56 connected between the live pawl and the spoke structure 36 of the corresponding rack element.

The machine cover is provided with a sight opening, not shown, which is disposed just to the left of the selector unit when this unit is in its terminal right-hand or full-cycle position. The latch levers 50 releasably hold the selector sectors in position against the force of springs 54 such that the "0" indication near the top of the dial element rims are in alignment with the sight opening in the housing. Limit stop means for this home or "0" position of the selector sectors is provided by engagement of an abutment formation 57 on each rack element spoke structure 36 with the tie rod 27. A limit stop for the selector sectors when in their other limiting position, that is, when the "9" designation near the lower end of the dial rim 38 of a sector is in alignment with the sight opening in the cover, is provided by engagement of the spoke structure 39 of the dial element with the tie rod 27. The input value carrying sectors also have intermediate positions corresponding to the numeral designations on their dials between "0" and "9" and provided by key set stop means presently to be described.

Since the selector or input value carrying sectors may be substantially identical in construction, a detailed description of one only has been given but it is to be understood that there are a plurality of such sectors arranged ordinally or in side-by-side relationship along the shaft 32, ten such sectors being shown in the drawings.

In addition to the end plates 23 and 24 and the tie rods 25 to 29, the selector mechanism cage includes forward and rearward or outer and inner stop pin guide plates 58 and 59 disposed in spaced-apart and substantially parallel relationship to each other at the front side of the cage and between the end plates thereof. The inner plate 59 is provided with series of apertures extending transversely thereof and spaced apart therealong with each series containing eight apertures spaced apart transversely of the plate and in alignment with the stop pawls of the corresponding selector sectors as the sectors turn about the axis of their mounting shaft 32. The outer plate 58 is also provided with a plurality of apertures, each of which registers with a corresponding aperture in the inner plate 59. A plurality of settable stop pins 60 are slidably mounted in the plate apertures, each pin being received in a pair of mutually registering apertures disposed one in the outer plate 58 and the other in the inner plate 59. Each pin carries limit stop means, such as the through pins 61 and 62, extending transversely through the stop pin at locations spaced apart longitudinal thereof and engageable respectively with the plates 58 and 59 to limit longitudinal movements of the stop pin relative to the supporting plates to the proper retracted and projected positions of the stop pin. A spring detent 63 may also be engaged with each stop pin to releasably hold the associated stop pin in either its retracted or projected position. There is one settable stop pin for each numeral designation between, but not inclusive of, "0" and "9" of each selector rack, a fixed stop being provided for the "0" and "9" positions as described above.

An arbor 65 is mounted on the frame and extends transversely thereof below the bottom plate 16, and pin setting bell-cranks 66, corresponding to the "1" to "8" keys of the keyboard, are pivotally mounted intermediate their lengths on this arbor in side-by-side relationship to each other. The bellcrank levers 66 have upwardly curved front ends so positioned below the bottom plate 16 that they are in alignment with the lower ends of corresponding plunger portions of the numeral key stems whereby the manual depression of any numeral key 17 will impart a rocking or angular movement to its corresponding pin setting lever 66.

Rearwardly of the arbor 65 the pin setting levers 66 are longitudinally bent or laterally offset so that their rearward end portions are slidably received, one above another, in a slot 67 in a fixed plate 68 which is upstandingly disposed immediately in front of the pin carriage section of the selector cage and extends transversely of the machine. The slot 67 extends upwardly from a location above the machine base and the pin setting levers are so constructed and arranged that the lever operated by the "1" key 17 has its rearward end at the lowest position in the slot 67, the lever operated by the "2" key has its rearward end next above the rearward end of the lever operated by the "1" key, the arrangement continuing in order up to the lever operated by the "8" key which lever has its rearward end at the highest position in the slot 67. Each lever 66 has its rearward end in alignment with the forward end of a corresponding stop pin 60 in the ordinal row of pins in alignment with the rearward ends of the pin setting levers 66 so that, when a numeral key is manually depressed, a corresponding stop pin will be set, that is, will be moved rearwardly from its retracted to its projected position.

A fixed bracket 70 is mounted on the machine base immediately forwardly of the pin engaging portions of the pin setting levers 66 below the arbor 65. The levers are provided with abutment nose formations 71 which abut against the rearward face of this bracket to positively position the levers in their normal or home position in which they are withdrawn from the corresponding stop pins. Tension springs 72 are connected one between an ear formation of each lever 66 and the bracket 70 and resiliently urge the levers to their normal or home position.

A sector latch releasing bar 73 extends longitudinally of the keyboard between the key supporting plates 15 and 16 and under the offset arms 21 of the key stems, in a longitudinal direction relative to the machine. This bar is supported at its ends by arms 74 and 75 secured on the ends of a shaft 76 journalled in the key support so that the bar can move downwardly under pressure of a manually depressed key and can be spring returned to its normal position.

A bellcrank lever 77 pivoted intermediate its length on the upper end of the bracket 70 has its upwardly curved forward end extended through an aperture in the lower plate 16 and positioned directly below the bar 73 so that the lever 77 will be rocked whenever the bar 73 is pressed down by depression of any one of the numeral keys.

A latch releasing dog 78 is pivotally mounted at its forward end on the machine base forwardly of the plate 68 and has at its rearward end a nose formation 79 which extends through an aperture 80 in plate 68, below and in alignment with slot 67, and underlies the forward end of the sector latch lever 50 at the bottom of the row of stop pins 60 in alignment with the slot 67. A link 81 is pivotally connected at its lower end to the dog 78 intermediate the length of the dog and pivotally connected at its upper end to the rearward end of the bellcrank lever 77, so that, when the lever 77 is rocked by downward movement of bar 73 the forward end of the latch lever 50 engaged by the nose 79 of latch releasing dog 78 is raised against the force of the associated spring 52 and the rearward end of the latch lever is moved out of engagement with the nose 53 of the corresponding selector sector live point or pawl 45.

With the selection mechanism so far described, when a numeral key bearing a numeral designation between "0" and "9" is depressed, the corresponding settable stop pin 60 is first projected into the path of the nose 53 of the pawl 45 of the corresponding selector sector and the latch lever 50 is then rocked to release the pawl 45 and free the sector to turn under the force of the associated spring 54 until the nose of the pawl 45 engages the projected stop pin 60 to terminate angular movement of the selector or input value digit carrying sector. The numeral designation on the sector dial corresponding to the depressed numeral key will then be brought into alignment with the sight opening in the machine cover.

It will be noted that if two or more numeral keys are simultaneously depressed, the sector will be turned to a position corresponding to the lowest numeral key value since the nose of pawl 45 will first encounter the stop pin set by the key having the lowest numeral value.

As there is no stop pin 60 or bellcrank 66 corresponding to the "9" key, depression of this key serves only to force the bar 73 downwardly. This releases the latch lever 50 from the pawl 45 of the sector in alignment with the slot 67 and frees the corresponding sector to turn until the dial element spoke structure 39 encounters the fixed stop bar 27. The "9" designation on the sector dial will then be brought into alignment with the sight opening in the cover.

As the selector segments are set to the selected dial readings, the shiftable selector unit 11, including the cage and the selector sectors, stop pins and latch levers carried by the cage, is stepped along the guide rails 30 and 31 in a direction from right to left so that selector sectors are successively brought into alignment with the slot 67 in fixed plate 68 as the digits of an entry number are registered from the highest to the lowest order of the entry by depression of the appropriate numeral keys 17.

A blade 385, as shown in Fig. 2, projecting to the left from the left-hand end of plate 23 engages the gears of the positive gear transmission 330, shown in Fig. 12, to the left of the shiftable selector unit 11, and holds these gears against movement away from their zero or full-cycle position, as will later appear.

3. Escapement mechanism.—Figs. 3, 4 and 5

A rack bar 84 is mounted on the upper edge portion of the rearward pin carrying plate 59 and has forwardly directed rack teeth 85 thereon. A sear arm 86 is pivotally mounted at one end on the rear, left-hand corner of the bottom key supporting plate 16, as indicated at 87, and extends to the left, as viewed in Fig. 4, along and below the rack bar 84. The arm 86 is provided on its free end with a detent formation 88 which projects upwardly between two adjacent teeth 85 of the rack bar 84 and releasably restrains the selector unit against movement to the left. A rack retarding pawl 90 is pivotally mounted at one end on the rearward right-hand corner of the bottom key supporting plate 16, as indicated at 91, and extends from its pivotal mounting to the right, as viewed in Fig. 4, along and forwardly of the rack bar 84.

The pawl 90 is provided at its free end with an inclined ear 92 which is normally disposed above the rack bar 84 but is movable into an interdental space of the rack bar when the selector unit is stepped to the left, as will be presently described. The sear arm 86 is provided at its pivoted end with a downwardly projecting extension 93. The pawl 90 is provided at its pivoted end with a similar downwardly projecting extension 94, and a tension spring 95 connected between the lower ends of the extensions 93 and 94 resiliently urges the free ends of the sear arm 86 and pawl 90 upwardly and the detent formation 88 into an interdental space of the rack bar 84.

The pawl 90 is provided near its free end with a longitudinally extending closed slot 96 having at its end nearest the free end of the pawl a downwardly extending recess 97 and a terminal extension 98 of the bar 73 beyond the pivot arm 75 is received in the recess 97.

When the bar 73 is pressed down by the depression of a numeral key, as described above, the terminal extension 98 of this bar forces the free end of pawl 90 downward and moves the detent 92 into the nearest interdental space of the rack bar 84. As the free end of pawl 90 moves downwardly, a shoulder 99 on the bottom edge of the pawl engages a pin 100 projecting forwardly from the free end of arm 86 and moves detent 88 downwardly and out of the interdental space in which it is engaged. As detent 92 has a thickness less than the distance between two adjacent teeth of the rack bar 84, this will permit a sufficient movement of the rack bar to the left to bring a tooth of the rack bar 84 above the detent 88 on the sear arm 86. When the manually depressed number key is released freeing the spring 95 to restore the arm 86 and pawl 90, the detent 92 will be moved out of the interdental space in which it is engaged and the detent 88 will first contact the bottom surface of the rack tooth immediately above it and then, as the rack bar 84 shifts to the left, set into the next interdental space to the right and terminate the leftward movement of the shiftable carriage 11. The selector mechanism will then have been shifted one ordinal space, that is, the overcenter distance between two adjacent selector sectors, to the left.

4. Zero key mechanism

A shaft 101, Figs. 3 and 5, is journalled near its ends in brackets upstanding from the plate 16 near the left-hand edge of the plate and carries on its forward end a blocking lever 102, the purpose of which will be later explained. On its rearward end the shaft 101 carries an actuating arm 103 from which a pin 104 projects into the slot 96 of the escapement pawl 90 and which is effective to actuate the escapement when the shaft 101 is rocked.

The "0" key 18 has an upright stem 107 mounted for vertical sliding movement on the machine frame plate 13 by vertically spaced-apart guide pins 108 and 109 extending from the frame plate 13 through corresponding slots provided in the key stem at locations spaced apart longitudinally of the stem. This key is resiliently urged to its upper limiting position by a spring 110 connected between the upper guide pin 108 and a stud 112 mounted on the key stem below the upper guide pin.

A shaft 113 is journalled in the keyboard supporting structure and extends transversely of the keyboard at the forward end of the latter.

A pin 114 is secured at one end to the zero key stem 107 adjacent the upper guide pin 108 and extends to the right from the key stem, and an arm 115 is fixed on and projects rearwardly from the shaft 113 adjacent the zero key stem 107 and also has in its rearward end a notch 116 through which the pin 114 extends. The shaft 113 is thus rocked when the zero key is depressed and restored. A second rearwardly directed arm 117 is mounted on shaft 113 adjacent and to the left of shaft 101 and overlies a leftwardly directed arm 118 of blocking lever 102 to rock the shaft 101 in a direction to operate the escapement mechanism and step the shiftable selector unit 11 one step to the left each time the zero key 18 is depressed.

As the zero key does not move the bar 73, none of the selector sector latches 50 are released. The selector sectors are thus restrained against angular movement and the only effect of operation of the zero key is to move the shiftable selector unit one step to the left to bring the zero designation on that selector sector immediately to the right of the sight opening in the cover into the sight opening.

The shiftable selector unit is resiliently urged in a left-hand direction along the guide rails 30 and 31 by suitable spring-actuated mechanism, such left-hand movement being controlled by the escapement mechanism above described, and is returned or restored from any position to the left of its limiting right-hand or home position by the power cycle mechanism of the machine during a power cycle operation.

The left-hand side of the detent formation 88 on the escapement sear arm 86 is so shaped that when the shiftable unit is returned to the right, the teeth of the rack bar 84 will slide over this detent, the escapement mechanism being effective to interrupt left-hand movement only of the shiftable unit.

5. Stop pin retracting mechanism

When the shiftable selector unit is returned to its home position, any of the settable stop pins 60 which have been projected during the leftward movement of the unit from its home position are automatically retracted.

Each pin is provided at the outer side of the outer pin carriage plate 58 with a longitudinally extending closed slot 120 and pin retracting finger bars 121 extend through the pin slots, there being one finger for each row of pins extending transversely of the machine or longitudinally of the shiftable selector unit. The finger bars are all secured at their right-hand ends to a fixed part of the machine frame so that the shiftable unit moves longitudinally of the finger bars and relative thereto. Each finger bar has a recess near its left-hand end and in alignment with slot 67 in plate 68 so that the settable pins in alignment with this slot can be projected by the number keys as described above. The right-hand sides of the above-described recesses in the finger bars are provided as cam surfaces which restore the settable pins of the corresponding rows to their retracted position as the pins move to the right of the cam surfaces. In order that the pins at the left-hand end of the shiftable selector mechanism may be restored to their retracted position by the finger bars 121 and then released for projection by the number keys the selector unit return mechanism is effective to first move the shiftable unit one step to the right past the home position of this unit and then return the unit to its home position where it is releasably held by the escapement mechanism.

6. Shiftable selector unit return mechanism.—Figs. 2 and 3

The mechanism for resiliently urging the shiftable selector or input value receiving unit to the left and returning it to its right-hand position during an operating cycle of the machine comprises a bellcrank lever 124, as shown in Fig. 2, pivotally mounted at its knee on the machine frame by a pivotal mounting 125 for rocking movement about an upright axis. One arm 126 of lever 124 extends rearwardly from pivotal mounting 125 and a link 127 connects the distal end of this arm to the left-hand end plate 23 of the cage of the shiftable selector unit 11. The other principal arm 128 of bellcrank lever 124 extends to the left from the pivotal mounting 125 and a third, minor arm 129 extends forwardly from the pivotal mounting.

A tension spring 130 is connected between the distal end of bellcrank arm 129 and a fixed point on the machine frame in a manner to resiliently urge the shiftable selector unit 11 to the left. An elongated link 131 is pivotally connected at its front end to the distal end of the bellcrank arm 128 by a pivotal connection 132 having two mutually perpendicular pivot axes.

The link 131 extends from the pivotal connection 132 rearwardly of the machine above and beyond a power driven cam shaft 135, as seen in Fig. 2, and is provided at its rearward end with a downwardly extending hook formation 136. A radially projecting arm 137 on the cam shaft carries at a location spaced from the cam shaft a laterally projecting pin 138 which is engageable with the hook formation 136. When the pin 138 is above the level of the cam shaft 135 during a power cycle operation of the cam shaft, the pin moves rearwardly relative to the machine and, upon engagement with the hook formation 136, pulls the link 131 rearwardly. This rocks the bellcrank 124 in a direction to push the shiftable unit 11 to its limiting right-hand position one step to the right of its home position. When cam shaft 135 has turned sufficiently to disengage the pin 138 from hook formation 136, spring 130 moves shiftable unit leftward to its home position where it is latched by the escapement mechanism.

POWER CYCLE MECHANISM

The power cycle mechanism of the machine includes an electric motor, not illustrated, mounted in the rear portion of the machine and provided with a suitable normally open switch which, when closed, completes the motor energizing circuit.

1. Speed reducing gear train.—Fig. 6

The mechanism of the present machine is driven by a motor, not shown herein, which drives a shaft 140 projecting through the frame side plate 14 of the machine and carrying a small spur gear 141, at the outer side of the frame plate. A cam shaft 135 is journalled in the frame plates 13 and 14 and the left-hand side plate 134 and extends transversely of the machine with its axis in spaced and substantially parallel relationship to the axis of the motor shaft. One end of the cam shaft projects through the plate 14 and a spur gear 142, larger than the gear 141, is journalled on this projecting end of the cam shaft. A first idler gear 143, larger than the gear 141, is journalled on an arbor 144 mounted on the frame plate 14 and meshes with the gear 141 and a gear 145, smaller than gear 143 is journalled on arbor 144 and secured to gear 143. A second idler gear 146, larger than the gears 141 and 145, is journalled on a frame carried arbor 147 and meshes with the small gear 145 and a reversing gear 148 journalled on a frame carried arbor 149 and meshes with the gears 146 and 142 to complete a speed reducing gear drive between the motor shaft and the cam shaft gear. The direction of rotation of gear 142 is retained the same as the direction of rotation of the motor shaft 140, or clockwise, as viewed in Fig. 6. At their outer ends, arbors 144 and 149 and shafts 140 and 135 are supported in a bracket 14' secured to, and spaced outwardly from, the right-hand frame plate 14.

2. Single rotation clutch.—Figs. 6 and 7

A one rotation or single cycle clutch, generally indicated at 150, is connected between the cam shaft gear 142 and the cam shaft 135 and includes a ratchet wheel 151, Fig. 7, secured to the gear 142, a ratchet pawl 152 pivoted at one end on a cam plate 157 secured on shaft 135 and having intermediate its length a single tooth engageable with the teeth of the ratchet wheel to drivingly connect the gear 142 to the cam shaft 135.

The pawl 152 is urged in a ratchet engaging direction by a spring 153 connected between the clutch plate 147 and the free end of the pawl 152, and a transverse shoulder 154 is provided on the pawl at the free end thereof. A pawl latch dog 155 is pivoted at one end on the frame plate 14 by a pivotal mounting 156 and is engageable at its free end with the pawl shoulder 154 to hold the pawl out of engagement with the ratchet wheel 151 under which conditions the motor shaft can rotate the gear 142 without rotating the cam shaft 135. When the latch dog is disengaged from the pawl shoulder 154, the pawl engages the ratchet wheel and drivingly connects the motor driven gear 142 to the cam shaft 135 for a single complete rotation of the cam shaft. Rotation of the cam shaft is terminated when the pawl shoulder 154 again comes into engagement with the free end of the pawl latch dog 155 and the pawl is moved out of engagement with the ratchet wheel.

The cam disk 157, which carries the pawl 152, is mounted on the cam shaft adjacent the gear 142 and has a circular periphery interrupted by a low portion 158 of limited angular extent. The latch dog 155 carries a laterally projecting roller 159 which rides on the periphery of the cam disk 157 and holds the latch dog 155 out of its pawl engaging position until the cam shaft has completed a rotation and returned to its home position at which time the roller 159 drops into the low portion 158 of cam 157 and frees the latch dog 155 to engage the pawl shoulder 154. This cam disk 157 also serves to hold a depressed control key down until the end of the operating cycle which was initiated by the depression of the control key, as will be presently described.

A spirally-shaped antibacklash cam disk 160, Fig. 6, is mounted on the cam shaft 135 and has a single radially disposed shoulder 161. A pawl 162 is pivotally mounted at one end on frame bracket 14' by a pivotal connection 165 and the free end of this pawl is held in engagement with the periphery of cam disk 160 by a spring 166 connected between the bracket 14' and the distal end of a pawl extension or tail 167. The pawl 162 engages the cam shoulder 161 when the cam shaft is in its home or full-cycle position and precludes any reverse rotation of the cam shaft when the rotation of the cam shaft satrts or terminates.

The clutch pawl latch dog 155 is moved to its pawl releasing position upon operation of a control key of the machine by a link 168 pivotally connected at its rear end to the latch dog 155. An extension 169 of this link extends rearwardly from the rear end of the link 168 to a connection with the motor switch to energize the motor when the cam shaft clutch is engaged. Forward movement of the link 168 and link extension 169 to engage the clutch and close the motor switch is resiliently resisted by a spring 164.

3. Cam and cam shaft assembly.—Fig. 7

The cam shaft 135, in addition to the clutch control cam disk 157, the antibacklash cam disk 160 and the shiftable selector carriage return cam 137 carries at locations spaced apart therealong, machine operating cam disks, as illustrated in Fig. 7, and including, from left to right along the cam shaft, the carriage return cam 137 and pin 138 for returning the shiftable selector unit to its home position, a pendant gear or shiftable transmission latching cam 170, a zero foil actuating cam 171 for the printing mechanism, a printing cam 172, a tens-carry actuating cam 173 for the machine accumulator, an actuator operating trail cam 174, an actuator operating lead cam 175, an actuator sector aligner cam 176, a sub-total cycle cam 177, a total cycle cam 178, and a transmission shifting cam 179.

All of the cams are shown in Fig. 7 in their home or full-cycle position from which they turn in a clockwise direction when viewed from the right-hand side of the machine, as explained above in connection with Fig. 6.

ACTUATING MECHANISM.—FIGS. 8, 9 AND 10

The actuator mechanism (Figs. 8, 9 and 10) comprises an axle shaft 185 journalled at its ends in intermediate frame plates 186 and 187 and extends transversely of the machine above and substantially parallel to the cam shaft 135. Actuator sectors 188, equal in number to the number of selector sectors plus two, are journalled in side-by-side or ordinal arrangement on the axle shaft 185 and extend from the axle shaft toward the shiftable selector unit 11.

Each actuator sector is substantially of the shape of a section of a circle and the axis of the axle shaft 185 extends through the centers of the hypothetical circles of which the corresponding sectors constitute sections. Gear teeth 189 are provided on the arcuate edges of the actuator sectors and each sector is provided with an elongated opening 190 having a longitudinal curvature centered on the axis of shaft 185. The sectors may also be provided with weight reducing openings, as shown in Figs. 8 and 9, if desired.

A rod or bail 192 extends through the openings 190 in the several actuator sectors. A pair of arms 193 and 194, shown in Fig. 10, rockably support the corresponding ends of the bail 192 which arms are mounted on the shaft 185 near the correspondingly opposite ends of this shaft, thereby supporting the bail 192 in spaced and parallel relationship to the axle shaft 185.

A yoke 195 of somewhat elliptical shape surrounds the cam shaft 135 and the actuator trail and lead cams 174 and 175. The yoke has an upwardly and forwardly projecting extension pivotally mounted on a fixed cam follower shaft 196 which extends transversely of the machine above and forwardly of the cam shaft 135, which follower shaft is supported in the side and intermediate plates of the machine frame. An arm 197 extends forwardly from the extension 195 and is pivotally connected by a spacing pin 198 to the distal end of one leg 199 of a ribbon feed actuating bellcrank lever 200 rockably mounted on the cam follower supporting shaft 196. The other leg 201 of bellcrank lever 200 extends upwardly from shaft 196 and is connected at its upper end to the forward end of a link 202 which drives the ribbon feed of the printing mechanism.

An arm 203 extends rearwardly from the rearward end of the yoke 194 and is pivotally connected at its rearward or distal end to the lower end of a link 204, the upper end of which is connected to the actuator bail 192.

The yoke carries on its upper side a cam following roller 205 riding on the peripheral edge of the actuator trail cam 174 and on its lower side a cam following roller 206 riding on the peripheral edge of the actuator lead cam 175, the yoke being disposed between the cams 174 and 175 and the roller 205 projecting from the right-hand side of the yoke while the roller 206 projects from the left-hand side of the yoke.

With this arrangement the bail 192 is positively moved both downwardly and upwardly and, during an operating cycle of the machine, is first moved to its lower position, is maintained in its lower position for a predetermined time interval and is then restored to its upper position.

A corresponding latch lever 208 is disposed adjacent one side of each actuator sector 188 and is pivoted at its upper end to the sector near the upper radial edge of the sector by a pivotal connection 209 and extends from the pivotal connection along the opening 190 in the actuator sector and past the side of the bail 192 remote from the axle shaft 185. The latch lever is angularly bent intermediate its length to provide at the side thereof adjacent the bail 192 a concave seat 210 which receives a roller 210' rotatably mounted on the bail 192, the roller 210' being received in the corresponding seat 210 when the bail is in its upper limiting position relative to the corresponding sector 188. The latch lever is resiliently held in engagement with the bail by a spring 211 connected between the sector 188 and the distal end of an arm 212 projecting angularly from the pivoted end of the lever 208. The portion of the lever 208 between the seat 209 and the free end of the latch lever constitutes a longitudinally curved tail portion 213 directed from the bail 192 toward the shaft 185.

When the bail is pulled downwardly by the action of the lead cam 175 on the cam follower 206, the engagement of the bail in the latch lever seat 210 pulls the sector 188 down until the sector is positively stopped at an angular position predetermined by the setting of a corresponding selector sector 33 at which time the bail moves out of the seat 210 and along the concave edge of the tail portion 213 of the latch lever to complete the downward movement of the bail. As the bail moves along the tail portion 213, it maintains downward pressure on the sector 188. The angularity of the tail portion to the remainder of the latch lever is such that this pressure is sustained by the force of spring 211 when the bail starts up again and until the bail positively engages the sector and returns it upwardly to its home or full-cycle position, the bail being moved upwardly by the action of trail cam 174 on follower 205.

The acutator unit is fixedly mounted in the machine just to the left of the shiftable selector unit when the latter is in its right-hand, home position and, when the selector unit is stepped to the left by its escapement mechanism, the orders of the selector unit from left to right are successively brought into alignment with the corresponding orders of the actuator mechanism from right to left. Thus the digits carried by orders in the left-hand end portion of the selector will be read out by corresponding orders in the right-hand end portion of the actuator unit.

When the bail 192 moves upwardly relative to the actuator sectors 188, it comes into engagement with abutment formations 214 at the upper ends of the openings 190 in the sectors, simultaneously moving into the seats 210 of the latch levers 208, and then moves the actuator sectors upwardly until the upper radial edges of the sectors abut against a stop bar 215 in the upper or full-cycle position of the actuator sectors.

PRINTING MECHANISM

The printing mechanism, generally indicated at 216, is disposed above the actuator mechanism with its orders in alignment with corresponding orders of the actuator mechanism. A plurality of print wheel drive gears 217 are journalled on a drive gear shaft 218 which extends transversely of the machine above and parallel to the cam shaft 135 and is mounted at its ends in the intermediate frame plates 186 and 187. The gears 217 are disposed in side-by-side or ordinal arrangement along the shaft 218 and the number of the gears is equal to the number of actuator sectors 188.

A plurality of print wheel carriers 221 are rockably mounted intermediate their length on a fixed shaft 222 which extends transversely of the machine in spaced and parallel relationship to the shaft 218. Each carrier 221 includes a pair of parallel arms 223 and 224 with the pairs of arms arranged in side-by-side or ordinal arrangement along the shaft 222 and in alignment with corresponding drive gears 217 and actuator sectors 188. Both arms 223 and 224 extend upwardly from the shaft 222 and near the upper ends of the arms, a pivot pin or axle 225 extends transversely through the two arms of each pair and carries an idler gear 226 which meshes with the corresponding drive gear 217. The arm 223 of the carrier pair 221 is extended upwardly and forwardly beyond the upper end of the arm 224 and carries an axle pin 227 spaced above the axle pin 225. A print wheel gear 230 is journalled on the axle pin 227 and includes a spur gear portion 231, the teeth of which mesh with the teeth of the idler gear 226 mounted in the same carrier and which is formed on one side of a print wheel portion 232 having printing bosses 233 projecting from the periphery thereof at uniformly spaced angular intervals therearound. It will be noted that the printing bosses 233 are spaced apart and that the outer surfaces of these bosses are made concave in a direction circumferentially of the printing wheel so that the outer surfaces of the bosses will fit against the cylindrical surface of a printing platen 242.

A plurality of bellcrank shaped, sector locking pawls 298, Fig. 11, are pivotally mounted in the side-by-side or ordinal arrangement on a pawl supporting shaft 299 which extends transversely of the machine rearwardly of, and below the cam shaft 135 and is mounted at its ends in the intermediate frame plates 186 and 187. Each of the locking pawls 298 comprises an arm 300 extending forwardly from the mounting shaft 299 and having on its distal end an upwardly projecting ear 301, and an arm 302 extending downwardly from the shaft 299. A spring 303 is connected between the lower end of each pawl leg 302 and a shaft 511, and resiliently urges the pawl to rock about the shaft 299 in a direction to insert the corresponding pawl detent 301 between two adjacent teeth 189 of the actuator sector 188 in alignment with the particular pawl. A comb bar 304 of right-angular cross-sectional shape is disposed below and parallel to the shaft 299 and is mounted on the shaft for pivotal movement by arms, as indicated at 305, positioned one at each end of the comb. The comb has an upwardly extending leg 306 provided with spaced-apart notches or slots respectively receiving the legs 300 of the locking pawls 298 and a substantially horizontally disposed leg 307 having spaced-apart slots or notches receiving the downwardly extending legs 302 of the locking pawls. A cam follower lever 310 is mounted at one end on the shaft 299 at one end of the shaft and is drivingly connected to the comb 304. A cam following roller 311 is mounted on the forward end of the lever 310 and rides on the peripheral edge of the total taking cam 178.

When the roller 311 is disposed on the lobe of the cam 178, as shown in Fig. 11, the comb 304 is held in such position that the forward edges of the locking pawl legs 302 engage the inner edges of the corresponding notches in the bottom or horizontal leg 307 of the comb and the detents 301 of the locking pawls are held by the comb out of engagement with the teeth of the actuator sectors 188. The locking pawls are held out of engagement with the actuator sectors until the end of the downward stroke of the actuator sectors and are brought into engagement with the sector gear teeth at the end of the downward movement of the sectors by riding of the cam follower 311 off of the lobe of cam 178 to hold the actuator sectors against movement below the positions determined by the corresponding selector sectors 33. In the upward movement of the actuator sectors the sector teeth ratchet over the pawl detents 301, the cam follower 311 riding up on the lobe of cam 178 to withdraw the pawls from the actuator sectors near the end of the operating cycle of the machine. The locking pawls 300 are made separately, one for each actuator sector, so that the detents 301 thereof can drop into interdental spaces of the corresponding actuator sectors as the sectors are brought into alignment at the positions in which they are stopped at the end of the downward stroke of the actuator bail 192, as described above.

When the movable selector sectors 33, Fig. 12, have been brought back to their home position and stopped, the latch levers 208 connecting the actuator bail 192 to the respective actuator sectors 188 will yield, so that the bail can complete its downward movement with no further movement of the actuator sectors.

Just prior to the locking of the actuator sectors by the detents 301 of the pawls 300, the actuator sectors are brought into alignment at the end of their downward stroke by suitable aligning mechanism, also shown in Fig. 11. This is necessary because the stop bar 27 for the home position of the selector sectors is so positioned that these sectors can move slightly beyond their normal home or full-cycle position in order to re-engage the noses 53 of the pawls 45 with the rearward ends of the sector latch dogs 50 when the selector sectors are returned to their "0" position by the downward stroke of the corresponding actuator sectors. This puts the actuator sectors and the print wheels driven thereby slightly out of their proper printing position and may leave the print wheels which have been released for printing out of accurate alignment across the print wheel orders.

The mechanism for accurately aligning the actuator sectors and the print wheels, when the sectors reach the end of their downward stroke and just before printing occurs, comprises a cam following rocker 312, Fig. 11, pivotally mounted intermediate its length on a cam rocker pivot shaft 313 positioned below the actuator sectors 188 and substantially parallel to the cam shaft 135. At its forward end the rocker 312 carries a cam following roller 314 which rides on the peripheral edge of the sector aligning cam 176 and a spring 315 extends downwardly from the rearward end of the rocker or lever 312 and is connected at its lower end to the machine frame to resiliently maintain the roller 314 in engagement with the periphery of the cam 176. A bail 316 of right-angular shape has substantially parallel legs, as indicated at 317 in Fig. 11, spaced apart a distance slightly greater than the length of the actuator mechanism and disposed at the inner sides of the intermediate frame plates 186 and 187. At the open end of the bail these legs 317 are pivotally mounted on shaft 319 carried on the frame and extend downwardly and forwardly so that the intermediate or cross member 318 of the bail is disposed immediately below the actuator sectors. The cross member 318 carriers at its front edge an upwardly and forwardly directed stop rib 320 so positioned that its edge remote from the cross member 318 will engage in approximately aligned interdental spaces of the actuator sectors 188 and bring these sectors into accurate angular or rotational alignment when the bail 316 is swung forwardly and upwardly about its pivotal mounting on the stop shaft 319.

An arm 321 of the rocker or lever 312 extends upwardly and rearwardly from the pivotal mounting of the lever 312 on the shaft 313 and is provided in its upper end with a notch 322. The lever 312 is positioned at the outer side of the intermediate frame plate 187 and this plate is provided with an aperture 323 at the upward end of the lever arm 321. A pin 324 extends from the bail leg 317 adjacent the plate 187 through the aperture 323 in this plate and is engaged in the notch 322 at the upper end of the lever arm 321 so that, when the forward end of the rocker arm 312 is forced downwardly by engagement of the lobe 325 of the cam 176 with the cam following roller 314, the bail 316 will be swung forwardly and upwardly to engage the leading edge of the rib 320 in interdental spaces of the actuator sectors 188 and bring these sectors into accurate alignment. As is apparent from the shape and relative position of the cams 176 and 178 in Fig. 11, the cam 176 acts first to bring the actuator sectors into alignment and immediately after the sectors have been aligned the rocker arm 310 is released to move the comb bar 304 in a direction to release the locking pawls 300 so that these pawls may be actuated by their springs 303 into locking engagement with the actuator sectors.

POSITIVE TRANSMISSION GEAR MECHANISM.—FIG. 12

The mechanism, as mentioned above, which drivingly connects the actuator sectors 188 to the selector sectors 33, comprises a positive transmission gear mechanism disposed between the actuator and selector sectors and generally indicated at 330 in Fig. 12. This gear mechanism 330 comprises a bail including parallel legs, as indicated at 331 in Fig. 12, spaced apart a distance somewhat greater than the length of the actuator mechanism and interconnected by a suitable cross member 332 and the gear shafts 334, 335 and 336. A top cross member or transmission shifting member extends perpendicularly from the upper end of one leg above the top gear shaft and is used to shift the positive gear transmission mechanism.

The cross member 332 provides a rigid cage or carriage for the transmission gears and the three gear shafts or axles 334, 335, and 336 extend transversely of the space between the bail legs 331 in spaced-apart and parallel relationship to each other and are mounted at their ends in the corresponding bail legs 331. A plurality of transmission gears 337 are journalled on the upper gear shaft 334 in side-by-side or ordinal arrangement, the number of these gears being equal to the number of actuator sectors 188 and the gears being constantly in mesh with the corresponding actuator sectors 188 and with the corresponding print wheel drive gears 217, as is shown in Fig. 8. A plurality of intermediate or reversing gears 338 equal in number to the number of selector sectors 33, are journalled in side-by-side or ordinal arrangement on the intermediate gear axle 335 and these gears mesh respectively with the gears 337. A plurality of gears 340 are journalled on the gear axle 336, also in side-by-side or ordinal arrangement, the number of these gears being one less than the number of selector sectors, and the gears 340 mesh with the corresponding intermediate or reversing gears 338. The gears 337, 338 and 340 are preferably all ten-tooth gears of the same size with teeth of the size of the teeth on the selector sectors 33 and on the actuator sectors 188.

The upper gear axle 334 is extended beyond the legs of the gear carrying cage and is mounted at its ends in the intermediate frame plates of the machine so that the entire cage can swing about the axis of the axle 334 carrying with it the gear axles 335 and 336 and the gears 338 and 340.

In the addition and subtraction cycles of the machine, the cage of the positive transmission mechanism is rocked by the cam 179 in a manner to bring the transmission gears 340 corresponding in number to the number of selector sectors which have been stepped to the left during the entry of the figure to be added or subtracted into the selector mechanism, into mesh with the corresponding selector sectors 33 during the first portion of the machine cycle in which the actuator segment bail 192 is given its downward stroke. During the downward stroke of the actuator bail, the actuator segments in alignment with the selector segments, which have been manually set and which are engaged or meshed with corresponding positive transmission gears 340 will be returned to their home or "0" position at which they are stopped by the stop bar 27. During the downward movement of the corresponding actuator sectors, the print wheels 230 in alignment with these sectors are rotated by the corresponding gears 337, 217 and 226, Fig. 8, to bring the numerals embossed on the print wheels, which correspond to the numbers for which the corresponding selector sectors are set in position, to impinge the platen 242 during the printing movement of the print wheels.

ACCUMULATOR MECHANISM.—FIG. 12

The accumulator mechanism of the adding machine is generally indicated at 390 and particularly illustrated in Fig. 12. This mechanism is provided as a unitary structure which is installed in the machine through an opening 391 in the machine base 392 and has a rigid frame including brackets, as indicated at 393, which are disposed one along each side of the opening 391 and extend upwardly through the opening, these brackets having perpendicularly offset, apertured lugs, which extend into recesses in the base at the corresponding sides of the opening 391 and are secured to the base by screw fasteners, as indicated at 395. The frame also includes left and right end plates disposed in spaced-apart and parallel relationship to each other, and a plurality of separator plates uniformly spaced apart between the end plates and disposed in parallel relationship to each other and to the end plates.

A main axle shaft 405 extends transversely through the plate assembly intermediate the height of the plates and is secured at its ends in the end plates. A plurality of accumulator gears 406 are mounted in side-by-side or ordinal relationship on the shaft 405 and are disposed one gear in each space between the adjacent spacer plates and one gear between each outside end plate and the adjacent spacer plate, there being eleven of these accumulator gears, or one more than the ten selector sectors, as described above. Each accumulator gear 406 has twenty gear teeth 407 uniformly spaced apart around its periphery and a tens-transfer cam structure 408 is disposed against one side of each accumulator gear and rigidly secured to the gear for rotation therewith.

A drive gear shaft 410 extends transversely through the plate assembly above and parallel to the shaft 405. This shaft 410 also extends at its ends outwardly of the outer sides of the end plates of the plate assembly. Accumulator drive gears 411 are journalled in side-by-side or ordinal arrangement on the shaft 410, there being eleven of these gears, disposed one in each space between adjacent plates of the plate assembly and meshing with the corresponding accumulator gears 406. Each drive gear has ten gear teeth 412 so that it requires two rotations of a drive gear to complete one rotation of the associated accumulator gear.

A detent shaft 414 extends transversely through the plate assembly at the upper, width reduced end of the assembly and detent pawls 415 are rockably mounted on the shaft 414 in ordinal arrangement along the shaft, there being one detent pawl for each of the accumulator drive gears 411. Each pawl has at one end a bearing portion 416 receiving the shaft 414 and at its other end a V-shaped detent formation 417 which engages in the interdental space at the upper side of the associated drive gear 411 to hold the drive gear and corresponding accumulator gear against accidental rotation. Each pawl is resiliently held in movement resisting engagement with its associated drive gear by a tension spring 418 connected between the pawl at a location intermediate the length of the pawl and a tie rod 419 which extends transversely of the plate assembly below and parallel to the detent shaft 414.

With the above-described arrangement it will be apparent that, when the positive gear transmisison 330 is rocked, as described above, to mesh its gears 340 with the accumulator drive gears 411 during the upward or return stroke of the actuator sectors 188, the drive gears 411 will be rotated in an additive or clockwise direction and will impart an opposite or counterclockwise rotation to the associated accumulator gears 406.

NEGATIVE TRANSMISSION GEAR MECHANISM

Means are also provided for rotating the accumulator gears in a negative or subtractive direction during the upward stroke of the actuator sectors 188 and this means includes a negative or subtractive gear transmission assembly, generally indicated at 420, Fig. 12.

The gear assembly 420 comprises a bail having parallel legs 421 spaced apart a distance at least as great as the length of the actuator mechanism and the accumulator mechanism and connected by a cross portion 422 extending transversely across the space between and joined at its ends to the legs 421. Spaced-apart and parallel gear shafts 423 and 424 are mounted at their ends in the bail legs 421 and extend across the space between these legs. A plurality of ten-tooth transmission gears 425 are mounted in side-by-side or ordinal arrangement on the shaft 423 while a plurality of similar, ten-tooth transmission gears 426 are mounted in side-by-side or ordinal arrangement on the shaft 424 and mesh with corresponding gears 425.

It will be noted that the positive gear transmission 330 has an odd number of gear sets, three such sets being shown in the accompanying drawings, while the negative gear transmission 420 has an even number of gear sets, two such gear sets being illustrated. This provides an arrangement wherein the positive gear transmission will rotate the accumulator drive gear 411 in one direction to add a positive or additive value to the accumulator while the negative transmission 420 will rotate the drive gears in the opposite direction to apply a subtractive or negative value to the accumulator.

The bail legs 421 of the negative transmission bail extends beyond the gear shaft 423 in a direction away from the gear shaft 424, and a pivot shaft provides a pivotal mounting for the negative gear transmission parallel to but spaced from both of the gear shafts 423 and 424. The negative transmission mechanism is rocked about its pivot shaft 427 by suitable mechanism.

From the above description it will be observed that the actuator sectors while undergoing their downward strokes are effective to rotate the accumulator drive gears 411 in either a positive direction or a negative direction depending upon whether the positive transmission gear mechanism 330 or the negative transmission gear mechanism 420 is moved into driving engagement with the accumulator drive gears 411.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the chains are, therefore, intended to be embraced therein.

What is claimed is:

1. An actuator mechanism for a calculating machine having a differentially positionable input value receiving rack, which comprises the combination of a rockable actuator segment, a bail for rocking said segment, and a lost-motion connection between said bail and said segment; an accumulator gear; and a pair of gear trains constantly in mesh with said actuator segment and alternatively positionable to engage said accumulator gear to rotate said accumulator gear in one or the other direction, one of said gear trains being also positionable to engage said input value digit receiving rack, and said gear trains including cradle means for supporting and positioning said gear trains.

2. In a calculating machine, differentially positionable input value members, means for moving said members comprising oscillatable denominational actuators, power actuated means for oscillating said actuators, a yieldable drive connection between said power actuated means and each actuator, a first postionable gear train in mesh with each of said actuators and positionable to connect its associated actuator with the denominationally related selection member, accumulator gears denominationally aligned with said actuators and drivenly connectable to said actuators by said first gear train, and a second gear train for connecting said actuators to the denominationally aligned accumulator gears in the alternative of said first gear train.

3. In a calculating machine having differentially settable input value selection racks, ordinally arranged actuator sectors arranged for rocking movements about a common axis, a power driven operator for rocking said actuator sectors, ordinally arranged accumulator gears adjacent said actuator sectors, means operative to selectively connect said actuator sectors to said input value selection racks and said accumulator gears, and yieldable connections operatively disposed one between each actuator sector and said operator and each comprising a follower lever pivotally mounted at one end on the corresponding actuator sector and extending past said operator, and resilient means urging said levers into engagement with said operator, each of said levers having intermediate its length an operator engaging shoulder and an operator engaging face extending from said shoulder to the free end of the lever and disposed at an angle to the portion of said lever between the pivotally mounted end thereof and said shoulder.

4. In a calculating machine having differentially settable input value carrying racks, ordinally arranged actuator sectors arranged for rocking movements about a common axis, a power driven operator for rocking said actuator sectors, ordinally arranged accumulator gears adjacent said actuator sectors, means operative to selectively connect said actuator sectors to said input value carrying racks and said accumulator gears, and yieldable connections operatively disposed one between each actuator sector and said operator and each comprising a follower lever pivotally mounted at one end on the corresponding actuator sector and extending past said operator, resilient means urging said levers into engagement with said operator, each of said levers having intermediate its length an operator engaging shoulder and an operator engaging face extending from said shoulder to the free end of the lever and disposed at an angle to the portion of said lever between the pivotally mounted end thereof and said shoulder, and rollers on said operator each engageable with a corresponding lever.

5. In a calculating machine having ordinally arranged and differentially settable input value carrying sectors, ordinally aranged accumulator gears, actuator mechanism, ordinally arranged printing elements, transmission means drivingly connecting said actuator mechanism to said printing elements and operative to selectively connect said actuator mechanism to said input value carrying sectors and said accumulator gears, and a power driven shaft, the arrangement wherein said actuator mechanism comprises toothed sectors ordinally arranged and mounted on a common shaft for oscillating movements between a full-cycle position and actuated positions determined by the differential setting of the corresponding input value carrying sectors, an operator bar disposed in spaced and substantially parallel relation to the shaft on which said actuator sectors are mounted, means connecting said power driven shaft to said operator bar effective to impart to said operator bar a movement from its full-cycle position to a predetermined operated position and back to its full-cycle position for each rotation of said power driven shaft, and pressure releasable connections provided one between each actuator sector and said operator bar whereby the movement of said operator bar may be continued to said operated position after the movement of one or more of said actuator sectors has been terminated by the differential setting of the corresponding input value carrying sectors.

6. An actuator mechanism for a calculating machine comprising a supporting shaft, gear sectors mounted on said shaft in spaced apart relationship for individual rocking movements about a common axis, each of said gear sectors having therein an opening spaced from said shaft, a bail extending through the openings in said gear sectors and disposed substantially parallel to said shaft, pressure releasable connecting means individual to said gear sectors releasably connecting said bail to said gear sectors, and power operated means cyclically oscillating said bail about said shaft.

7. An actuator mechanism for a calculating machine comprising a supporting shaft, gear sectors mounted on said shaft in spaced apart relationship for individual rocking movements about a common axis, each of said gear sectors having therein an opening spaced from said shaft, a bail extending through the openings in said gear sectors and disposed substantially parallel to said shaft, and connecting means individual to said gear sectors releasably connecting said bail to said gear sectors, each of said gear sectors and said bail constituting relatively movable members and said connecting means comprising a rounded detent means carried by one of said members and abutment means carried by the other of said members and releasably held in engagement with said detent means.

8. An actuator mechanism for a calculating machine comprising a supporting shaft, gear sectors mounted on said shaft in spaced apart relationship for individual rocking movements about a common axis, each of said gear sectors having therein an opening spaced from said shaft, a bail extending through the openings in said gear sectors and disposed substantially parallel to said shaft, and connecting means individual to said gear sectors releasably connecting said bail to said gear sectors, each of said gear sectors and said bail constituting relatively movable members and said connecting means comprising a roller carried by one of said members and a longitudinally curved tongue pivotally mounted on the other of said members and resiliently held in engagement with said roller, said tongue having intermediate its length a rounded notch partially receiving said roller.

9. In a calculating machine having power operated mechanism, control keys connected to said power operated mechanism and operative to establish separate operating cycles thereof, an input value selector mechanism having ordinally arranged gear elements angularly movable about a fixed axis and differentially settable to selected entry values, an accumulator having ordinally arranged gears angularly movable about a fixed axis parallel to said selector gear axis, actuator mechanism comprising ordinally arranged gear sectors angularly movable about a fixed common axis parallel to said selector gear axis, a bar disposed parallel to and coextensively of the common axis of said gear sectors and reciprocably moved by said power operated mechanism during each operating cycle of the latter in an arcuate path centered on said common axis, and a resiliently releasable connection between each of said gear sectors and said bar effective to maintain pressure on the corresponding sector in the same direction during movement of said bar in opposite directions, and transmission mechanism including ordinally arranged gear trains disposed with one end of each gear train in mesh with a corresponding actuator gear sector, said transmission mechanism being movable to bring the other ends of its gear trains into and out of mesh with corresponding selector gear elements and accumulator gears.

10. In a calculating machine having differentially settable denominational input value receiving members and denominational accumulator gears spaced from said input value receiving members and rotatable about a fixed axis, actuating mechanism comprising oscillatable denominational actuators, a power-driven operator for oscillating said actuators, a yieldable drive connection between each actuator and said operator, a first gear train assembly having ordinal gear trains in mesh with the coordinal actuators and positionable to connect said actuators individually with the denominationally related input value receiving members and subsequently positionable to connect said actuators with the denominationally related accumulator gears to rotate said accumulator gears in one direction, and a second gear train assembly having ordinal gear trains in mesh with the coordinal actuators and positionable alternatively with said first gear train assembly to connect said actuators with said accumulator gears for rotation of said accumulator gears in the opposite direction, said yieldable drive connections each comprising a follower lever mounted on the corresponding actuator and having a camming shoulder formed thereon and adapted to engage said operator, and resilient means urging said lever into engagement with said operator.

11. In a calculating machine having ordinally arranged input value selection racks, means effective to differentially set said selection racks, and ordinally arranged accumulator gears spaced from said selection racks and rotatable about a fixed axis, actuator mechanism comprising rockably mounted actuator segments disposed in ordinal arrangement, a rockable bail for rocking said actuator segments, a pressure releasable connection between each actuator segment and said bail, and two gear assemblies each including a movably mounted cradle and ordinally arranged gear trains in each cradle, said actuator mechanism having in each order thereof an actuator segment, a gear train of one of said gear assemblies constantly in mesh at one end with the coordinal actuator segment and sequentially movable at its other end into mesh with the coordinal selection rack and the coordinal accumulator gear, and a gear train of the other of said assemblies constantly in mesh at one end with the coordinal actuator segment and movable at its other end into mesh with the coordinal accumulator gear alternatively of the coordinal gear train of said one gear assembly.

References Cited in the file of this patent

UNITED STATES PATENTS

| | | |
|---|---|---|
| 1,253,310 | Von Reppert | Jan. 15, 1918 |
| 2,014,561 | Dysart | Sept. 17, 1935 |
| 2,074,017 | Fuller et al. | Mar. 16, 1937 |
| 2,583,810 | Boyden | Jan. 29, 1952 |
| 2,584,864 | Goldberg | Feb. 5, 1952 |
| 2,647,687 | Parsons et al. | Aug. 4, 1953 |

UNITED STATES PATENT OFFICE

CERTIFICATE OF CORRECTION

Patent No. 2,832,531 April 29, 1958

Harold J. Chall

It is hereby certified that error appears in the printed specification of the above numbered patent requiring correction and that the said Letters Patent should read as corrected below.

Column 2, line 23, for "machanism" read -- mechanism --; line 69, after "includes" insert -- a --; column 3, line 18, for "key" read -- keys --; column 4, lines 66 to 71, after the symbols strike out the period, each occurrence; column 11, line 74, for "Whe" read -- When --; column 13, line 26, for "satrts" read -- starts --; column 15, line 71, strike out "the"; column 20, line 22, for "chains" read -- claims --.

Signed and sealed this 28th day of October 1958.

(SEAL)
Attest:

KARL H. AXLINE
Attesting Officer

ROBERT C. WATSON
Commissioner of Patents